(12) United States Patent
Stine et al.

(10) Patent No.: US 9,560,201 B2
(45) Date of Patent: *Jan. 31, 2017

(54) PERSONALIZING COMMUNICATIONS SERVICES USING ENVIRONMENTAL DATA

(71) Applicants: AT&T INTELLECTUAL PROPERTY I, L.P., Atlanta, GA (US); AT&T Mobility II LLC, Atlanta, GA (US)

(72) Inventors: Ted Stine, Suwanee, GA (US); Joseph Anthony Speeney, Basking Ridge, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,102

(22) Filed: Jan. 6, 2016

(65) Prior Publication Data

US 2016/0119476 A1 Apr. 28, 2016

Related U.S. Application Data

(63) Continuation of application No. 13/307,839, filed on Nov. 30, 2011, now Pat. No. 9,264,542.

(51) Int. Cl.
*H04M 3/00* (2006.01)
*H04M 5/00* (2006.01)
(Continued)

(52) U.S. Cl.
CPC .......... *H04M 3/5166* (2013.01); *H04M 3/493* (2013.01); *H04M 3/5183* (2013.01);
(Continued)

(58) Field of Classification Search
CPC ............ H04M 3/493; H04M 2203/357; H04M 2203/551; H04M 2203/555
(Continued)

(56) References Cited

U.S. PATENT DOCUMENTS 5,511,112 A   4/1996   Szlam
5,684,872 A   11/1997  Flockhart et al.
(Continued)

OTHER PUBLICATIONS

U.S. Appl. No. 13/239,968 to James Fan et al., filed Sep. 22, 2011.

*Primary Examiner* — Thjuan K Addy
(74) *Attorney, Agent, or Firm* — Greenblum & Bernstein, P.L.C.

(57) ABSTRACT

A method for personalizing communication services includes setting a series of selectable options as a default for a system that provides personalized communication services. When a communication from an initiating party is received, a computer of the system automatically determines, based on environmental data provided for the communication independent of information provided by the initiating party during the communication, predictive information that predicts potential objectives potentially sought by the initiating party in initiating the communication. Probabilities are assigned, based on the predictive information, that selectable options will address the potential objectives. The default series of selectable options are dynamically updated based on the assigned probabilities. Communications with the initiating party are in accordance with a script that includes the dynamically updated series of selectable options.

20 Claims, 9 Drawing Sheets

(51) Int. Cl.
*H04M 3/493* (2006.01)
*H04M 3/51* (2006.01)

(52) U.S. Cl.
CPC  *H04M 2203/357* (2013.01); *H04M 2203/551* (2013.01); *H04M 2203/555* (2013.01)

(58) Field of Classification Search
USPC .......................... 379/265.01, 265.05, 265.11, 266.01,379/266.08, 265.1; 704/240, 262
See application file for complete search history.

(56) References Cited

U.S. PATENT DOCUMENTS

| | | |
|---|---|---|
| 6,064,730 A | 5/2000 | Ginsberg |
| 7,127,400 B2 | 10/2006 | Koch |
| 7,437,294 B1 | 10/2008 | Thenthiruperai |
| 7,920,682 B2 | 4/2011 | Byrne et al. |
| 8,238,541 B1 | 8/2012 | Kalavar |
| 8,345,835 B1 | 1/2013 | Or-Bach et al. |
| 8,369,967 B2 * | 2/2013 | Hoffberg ................ G05B 15/02 340/507 |
| 8,396,195 B2 | 3/2013 | Malik et al. |
| 8,600,036 B1 | 12/2013 | Warder |
| 2003/0161464 A1 | 8/2003 | Rodriquez et al. |
| 2006/0095273 A1 | 5/2006 | Montvay et al. |
| 2007/0189480 A1 | 8/2007 | Salafia et al. |
| 2008/0098306 A1 | 4/2008 | Gao et al. |
| 2010/0158210 A1 | 6/2010 | Awad et al. |
| 2011/0154209 A1 | 6/2011 | Fan et al. |
| 2011/0274257 A1 | 11/2011 | Vaananen |
| 2012/0195422 A1 | 8/2012 | Famous |

* cited by examiner

Default States

Updated States

Figure 9

Script X, State QFRR Prediction Information: Area 655, Equipment ZXX, Gender M, Age 40-50

State QFRR
Ultimate
Resolution

Option

| | | | | |
|---|---|---|---|---|
| 1 | 2% | | | |
| 2 | 1% | | State QFRR | |
| 3 | 17% | | Ultimate | |
| 4 | 9% | | Resolution | |
| 5 | 2% | | | |
| 6 | 15% | | Option | |
| 7 | 1% | | | |
| 8 | 5% | | 3a | 7% |
| 9 | 3% | | 3b | 5% |
| 10 | 1% | | 3c | 4% |
| 11 | 3% | | 3d | 1% |
| 12 | 1% | | 6a | 6% |
| 13 | 2% | | 6b | 4% |
| 14 | 3% | | 6c | 4% |
| 15 | 2% | | 6d | 1% |
| 16 | 1% | | 22a | 5% |
| 17 | 2% | | 22b | 3% |
| 18 | 4% | | 22c | 3% |
| 19 | 1% | | 22d | 2% |
| 20 | 2% | | 4a | 3% |
| 21 | 1% | | 4b | 3% |
| 22 | 13% | | 4c | 2% |
| 23 | 3% | | 4d | 1% |
| 24 | 2% | | | |
| 25 | 1% | | | |
| 26 | 3% | | | |

PERSONALIZING COMMUNICATIONS SERVICES USING ENVIRONMENTAL DATA

CROSS-REFERENCE TO RELATED APPLICATIONS

This application is a continuation of pending U.S. patent application Ser. No. 13/307,839, filed on Nov. 30, 2011, the disclosure of which is expressly incorporated herein by reference in its entirety.

BACKGROUND

1. Field of the Disclosure

The present disclosure relates to personalizing communications services. More particularly, the present disclosure relates to personalizing communications services using environmental data to dynamically communicate.

2. Background Information

Interactive voice response systems iteratively present sets of selectable choices to callers in accordance with predetermined scripts. A selection among selectable choices at one level of a predetermined script leads to a presentation of requested information or a presentation of additional selectable choices as the next level of the predetermined script. A first set of selectable choices in a script is presented uniformly to all callers to a number, and presented information and/or second and subsequent sets of additional selectable choices vary based on the selected choice at the previous level.

BRIEF DESCRIPTION OF THE DRAWINGS

FIG. 9 shows a table of predictive information for script options for a communication.

DETAILED DESCRIPTION

Figure 1:
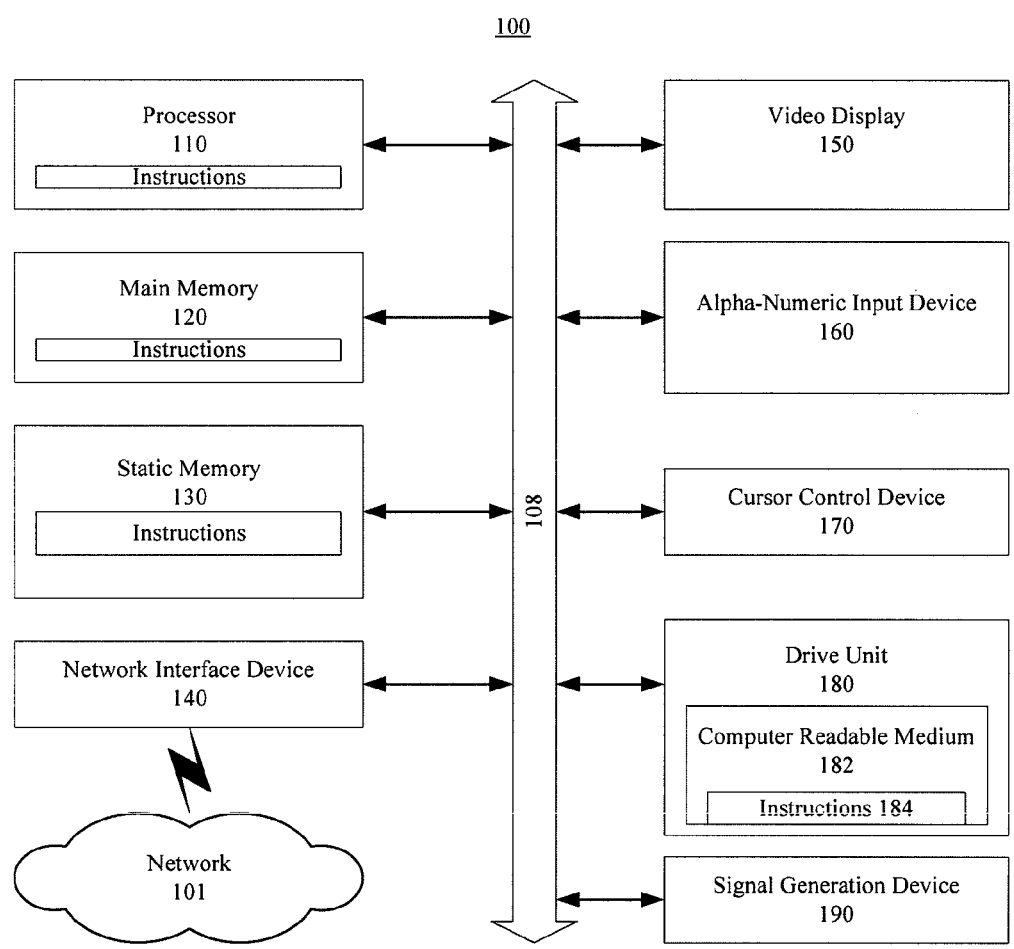
FIG. 1 shows an exemplary general computer system that includes a set of instructions for personalizing communications services using environmental data, according to an aspect of the present disclosure.

In view of the foregoing, the present disclosure, through one or more of its various aspects, embodiments and/or specific features or sub-components, is thus intended to bring out one or more of the advantages as specifically noted below.

Interactive systems as described herein include interactive voice response systems that interact with parties over telecommunications networks and automated systems that interact with parties over the Internet. Interactive systems interact in accordance with scripts to present parties with information and selectable options, and the interactive systems may be integrated with other systems to fulfill orders and other types of transactions on behalf of the parties. The interactive systems may interact with parties audibly and/or visibly over the telecommunications networks and/or Internet.

The interactive systems are assigned responsibilities for specific topics, and may provide services for many different topics. For example, parties may call or visit a communications address with the expectation that an interactive system at the address is responsible for a particular topic or many different topics. The interactive systems operate in accordance with the scripts, and data of the parties is stored in a memory for use in improving the scripts and offerings of the interactive systems.

As used herein, party data is data characteristic of and specific to a party, and interaction data is a form of party data that characterizes interactions in a communication between a party and an interactive system. Interaction data includes characteristics of communications including a record of options and information presented to a party, as well as selections of options by the party. Party data also includes other data characteristic of communications between the party and interactive system, including originating communications addresses and locations, times, dates and modes of communications. Party data also includes profile data, purchase or other history data, privately linked or public social accounts or home network data of the party, subscription data, registration data, and any other forms of data collected by an entity in association with a particular party. Party data from social media accounts may include data showing products and services "liked" by a party, as well as artists and music rated highly by a party. In an embodiment, following a communication with an interactive system, a party may be able to share on a social network website a link to a product, or a positive reference to an agent profile, or the information provided by an agent. The shared information may then later be identified and used as environmental data to help the party's contact and friends and others when they contact the interactive system.

Environmental data is a record of party data for past communications between parties and interactive systems, and includes party data for multiple parties and multiple communications. The environmental data is stored in a memory in the form of records of individual communications, and includes characteristics of the communications such as the area in which a communication originates, a topic for which the communication was originated, demographic information of a party in the communication, time and date of the communication, an agent that ultimately resolved the communication, and the interaction data of options and information presented to a party and selections of options by the party. A database or other memory may store environmental data for multiple interactive systems that share the environmental data as described herein.

As used herein, the available party data for a new communication can be analyzed and used to determine environmental data of past communications that will assist in predicting how a script can be improved. Based on the predictive information, the script is dynamically updated and personalized for use by the interactive system in the new communication. Environmental data of past interactive communications is automatically retrieved or otherwise provided for a new communication, and can be provided independent of information affirmatively provided by the initiating party during the communication. Therefore, using party data that is automatically provided or that can be automatically identified without a party uttering or writing a word, the script for assisting the party can be updated to provide the options and/or information determined to be most likely sought by the party based on analysis of the environmental data of past communications involving other parties.

As an example of how party data can be used, when an initiating party contacts an interactive system, the interactive system may automatically receive or retrieve the party's communications address, such as a caller's calling number, a requester's Internet Protocol (IP) address, or a sender's email address. Additionally, when an initiating party contacts an interactive system, the interactive system may automatically determine, identify or otherwise recognize the time of the call or request as well as the mode of the call or request. An initiating party may be pre-registered with the interactive system, so that party data may be automatically retrieved from a database based on the interactive system recognizing the initiating party's communications address. Alternatively, the initiating party may have a communications apparatus that stores a profile for the initiating party, and automatically sends profile data to an interactive system when the customer contacts the interactive system. For example, a customer may place a call to an interactive system from a smartphone, and either the interactive system recognizes the customer's calling number to automatically retrieve the customer's registered information or profile data from a database, or the smartphone automatically recognizes the dialed number for the interactive system and automatically forwards the profile data to the interactive system. Any form of party data can then be used to obtain and analyze environmental data from past communications in the manner described herein.

Party data is analyzed to determine information specific to the communication and/or party that communicates with the interactive system. As an example of how party data is analyzed, a communications address of a party in a new communication can be searched in a database to find an address or other location of the party, or a profile or party history corresponding to the communications address may specify an address or other location of the party. In either circumstance, environmental data of earlier communications from within an area that includes the address or other location can be obtained. For example, the pattern of selections or resolutions of other communications from within the area can be analyzed to find patterns of how the other communications were ultimately resolved.

After a new communication begins and the environmental data from other communications is determined, obtained and analyzed, predictive information is then generated to assign probability ranks or scores to selectable options and information presented in the other communications. The script for the new communication is then dynamically updated so that the highest rated choices or information presented in other communications is presented by the interactive system in the first or subsequent stage of the new communication. Communications with the initiating party are then performed in accordance with the updated script. The script may be dynamically updated at one stage, or at more than one stage.

Using the environmental data of past communications, the script for a party is dynamically personalized and the party is presented with information and options personalized based on the party's own party data.

As an example, party data of a party in a new communication may be analyzed to identify a subscription of a party, and environmental data from earlier communications with the same party and/or other initiating parties with the same subscription can be identified for analysis to see how the previous communications were resolved. Initial party data may also be analyzed to identify a location of a party, and environmental data from earlier communications with other initiating communications parties at the same location or in the same area may be identified to see why the other parties initiated the communications in the past.

Predictive information as used herein is information that predicts the information or selectable options an initiating party is most likely to want, so that the highest ranked or scored information or selectable options is provided to the party as part of a dynamically updated script. The predictive information may therefore be used to replace predetermined options with replacement options, or to replace predetermined information with replacement information. The predictive information may be a rank or score or grade or other metric to distinguish possible information or selectable options from one another for the purpose of dynamically updating a script for communicating with the initiating party.

As an example, an interactive voice response system may provide scores of current and recent sports events. Using party data, the interactive system may determine that a party in a new call is from Chicago, and analysis of environmental information from recent calls from the Chicago area may reveal which scores were most sought by callers from the Chicago area.

Another example of use of environmental data is when a communications party at a communications address initiates an Internet chat session with an intelligent virtual service agent. A geographic area the initiating party is in is determined using the communications address, and recent chat sessions with other parties in the same geographic area are then identified. The recent chat sessions with the other parties are analyzed to determine the most popular initial selections of the other communications parties, and the most popular selections of the other communications parties are then used to dynamically determine the initial set of options to offer the initiating party in the chat session. A second set of options to offer the initiating party for selection may also be dynamically determined using the secondary choices most popular with other communications parties who selected the same first choice as the initiating party.

Another example using party data is when purchase history data shows an item or service purchased from the provider of the interactive system. Initial selections in recent communications with other parties with the same or similar items or services may be analyzed to determine the most popular initial selections.

Parties may also be provided a selection option of agents to choose from for a communication, in the event that an interactive system does not resolve the communication. Environmental data can be used to help determine which agents in a pool are most likely to be best suited to assist a party. The party may be offered profiles of multiple agents so that the communications party selects an agent with whom to communicate. The agents may be offered for selection based on subject matter specialization or other characteristics. As described herein, agents can be assigned or made available to communications parties based on environmental data dynamically determined during a communication. In an embodiment, availability times of agents may also be provided, so that a party can select an agent in advance with knowledge of when the agent is expected to be available.

Party data may include data that reflects agent preference for a party, including data indicating particular agents previously rated poorly by a party and particular agents previously rated highly by a party. The availability of agents rated highly may be presented to a party as options.

Although various embodiments and examples herein describe telephone calls and interactive voice response systems, communications as described herein may include video and image-based communications. As an example, a call to an interactive voice response system from a smart phone may result in sets of options and information being provided visually to the caller on the smartphone. An example of information that may be provided visually would be a map overlay showing an area where a service is having problems relative to the caller's location. The area of problems may be determined from other callers.

FIG. 1 is an illustrative embodiment of a general computer system, on which a method of personalizing communications services using environmental data can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a desktop computer, a server computer, a tablet personal computer (PC), a personal digital assistant (PDA), a mobile device, a global positioning satellite (GPS) device, a palmtop computer, a laptop computer, a communications device, a wireless telephone, a control system, a personal trusted device, a web appliance, a network router, switch or bridge, an interactive system computer, an environmental coordination computer, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
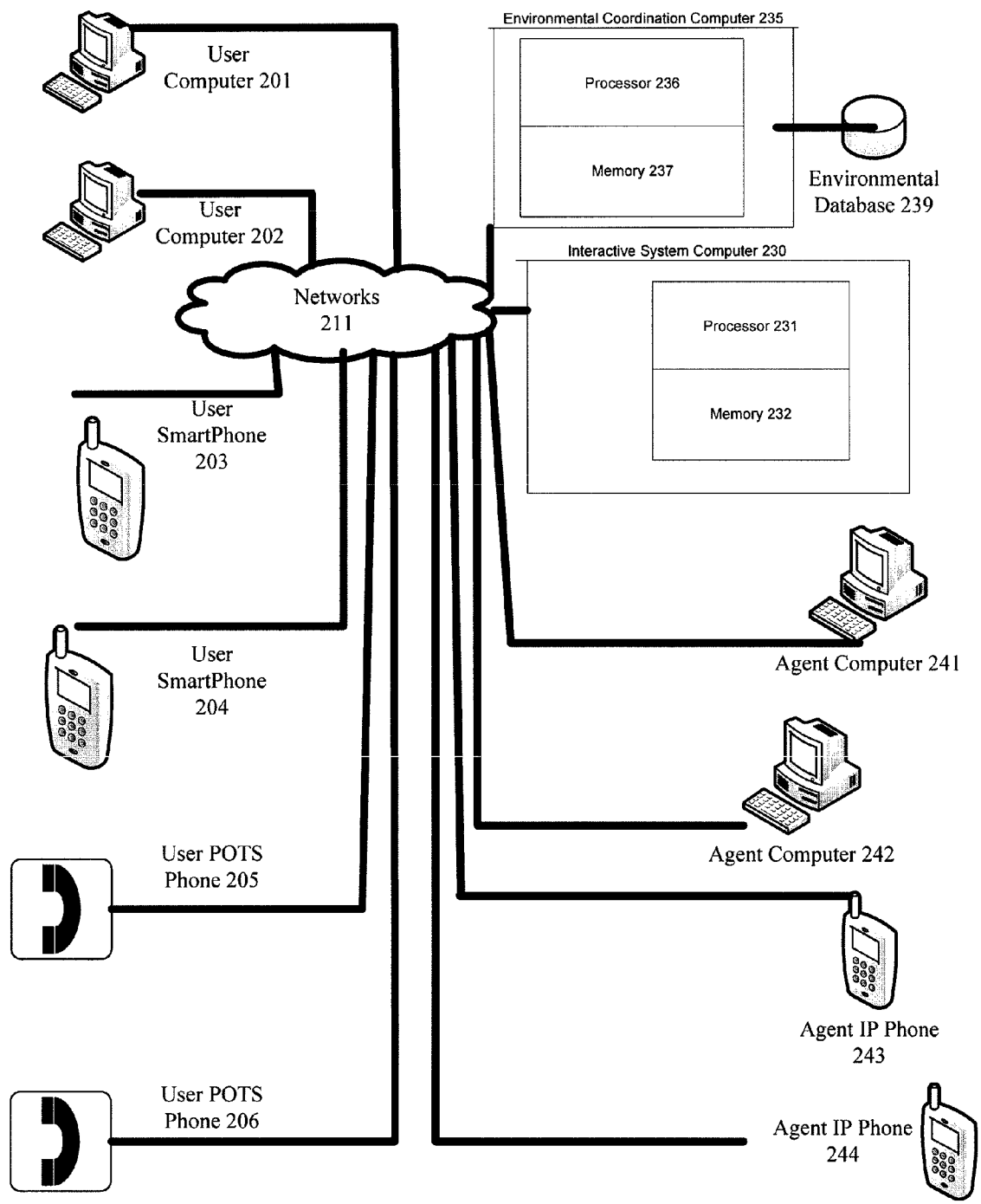
FIG. 2 shows an exemplary network for personalizing communications services using environmental data, according to an aspect of the present disclosure.

FIG. 2 shows an exemplary network that includes an environmental coordination computer 235 and an interactive system computer 230 to provide personalized communications services using environmental data, according to an aspect of the present disclosure. In FIG. 2, user computers 201 and 202, user smartphones 203 and 204, and user telephones 205 and 206 each communicate across networks 211 with an interactive system computer 230. The interactive system computer 230 is a computer such as the general computer system 100 shown in FIG. 1, and includes processor 231 and memory 232. The interactive system computer 230 is coordinated by an environmental coordination computer 235 which stores and accesses data in an environmental database 239.

In the embodiment of FIG. 2, the environmental coordination computer 235 coordinates environmental data for interactive system computer 230 and other interactive systems by collecting environmental data from past communications for communications between the interactive systems and parties. Analysis of party data and environmental data can be performed by the environmental coordination computer 235 on behalf of interactive systems. Additionally, the environmental coordination computer 235 may generate predictive information on behalf of interactive systems. The environmental coordination computer 235 is a computer such as the general computer system 100 shown in FIG. 1, and includes processor 236 and memory 237. The environmental coordinating computer 235 analyzes retrieved environmental data, stores the environmental data in the environmental database 239, and dynamically retrieves and analyzes environmental data upon request from interactive system computer 230.

In the embodiment of FIG. 2, agent systems are shown by way of agent computers 241 and 242, and agent IP phones 243 and 244. Human and virtual agents in FIG. 2 may contribute environmental data from their communications to the environmental coordination computer 235, and may also receive environmental data from the environmental coordination computer 235.

In the embodiment of FIG. 2, either interactive system computer 230 or environmental coordination computer 235 may automatically determine predictive information for a communication based on environmental data. Also, either interactive system computer 230 or environmental coordination computer 235 may use the predictive information to dynamically update the script for communicating with the party with whom the interactive system computer 230 is communicating. In other words, the determinations of predictive information and actual updating of the script may be performed either by the system that is communicating with a communications party or by a centralized environmental coordination computer that coordinates environmental data and predictive information.

In another embodiment, interactive system computer 230 and similar systems perform their own analysis of party data and environmental data, as well as generation of predictive information based on the analysis. In this regard, in the use of party data, environmental data and predictive information, interactive systems may be self-directed or may be coordinated centrally.

Figure 3:
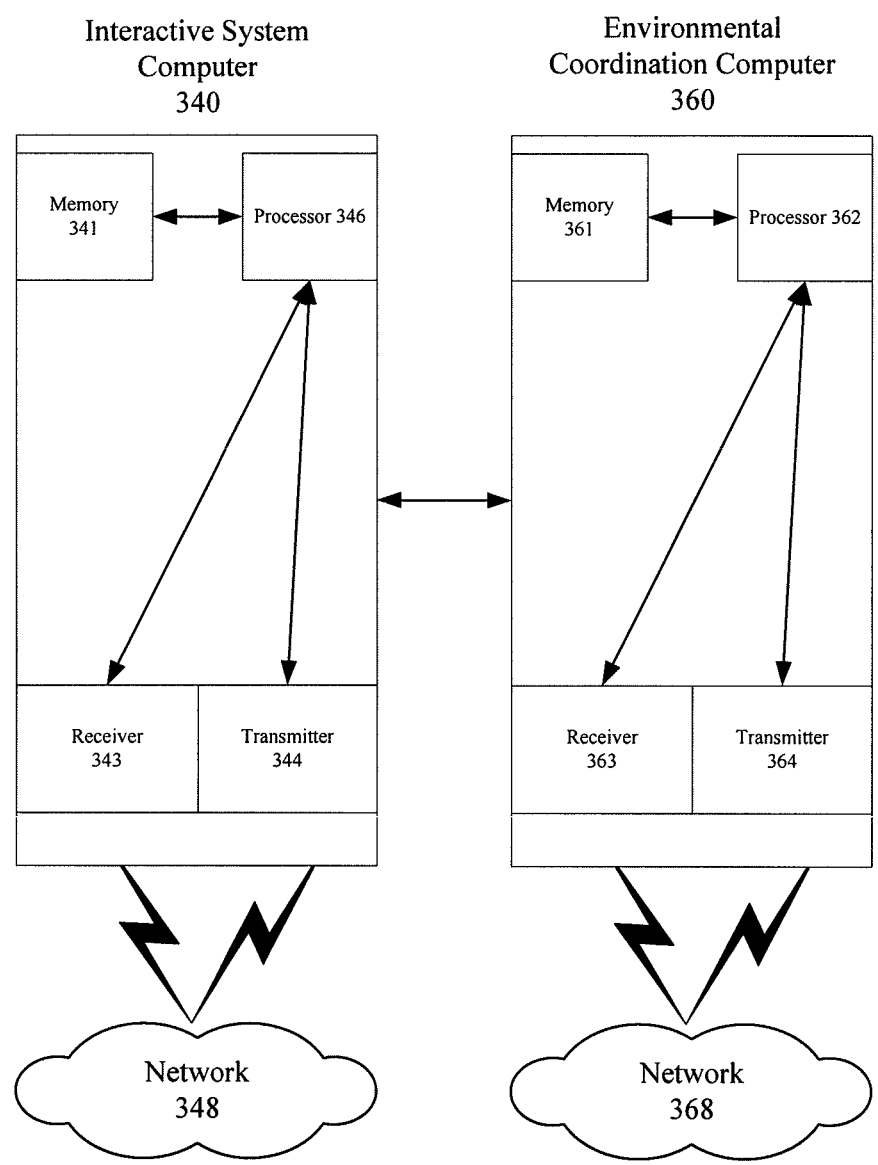
FIG. 3 shows an exemplary interactive system computer and an exemplary environmental coordination computer for personalizing communications services using environmental data, according to an aspect of the present disclosure.

FIG. 3 shows an exemplary interactive system computer 340 and an exemplary environmental coordination computer 360 for personalizing communications services using environmental data. In FIG. 3, interactive system computer 340 includes a memory 341, a processor 346, a receiver 343 and a transmitter 344. The receiver 343 and transmitter 344 communicate over network 348. The processor 346 processes instructions and data from the receiver 343 and memory 341, and forwards instructions or data to transmitter 344 for transmission or to memory 341 for storage. In FIG. 3, environmental coordination computer 360 includes a memory 361, a processor 362, a receiver 363 and a transmitter 364. The receiver 363 and transmitter 364 communicate over network 368. The processor 362 processes instructions and data from the receiver 363 and memory 361, and forwards instructions or data to transmitter 364 for transmission or to memory 361 for storage.

The interactive system computer 340 and environmental coordination computer 360 also communicate with each other in the embodiment of FIG. 3. The servers may communicate over a communications network, or may alternatively be implemented on the same physical computer. The environmental coordination computer 360 may coordinate the use of party data and environmental data for multiple interactive systems such as interactive system computer 340, so that an environmental database 239 in FIG. 2 shares environmental data among more than one interactive system.

Figure 4:
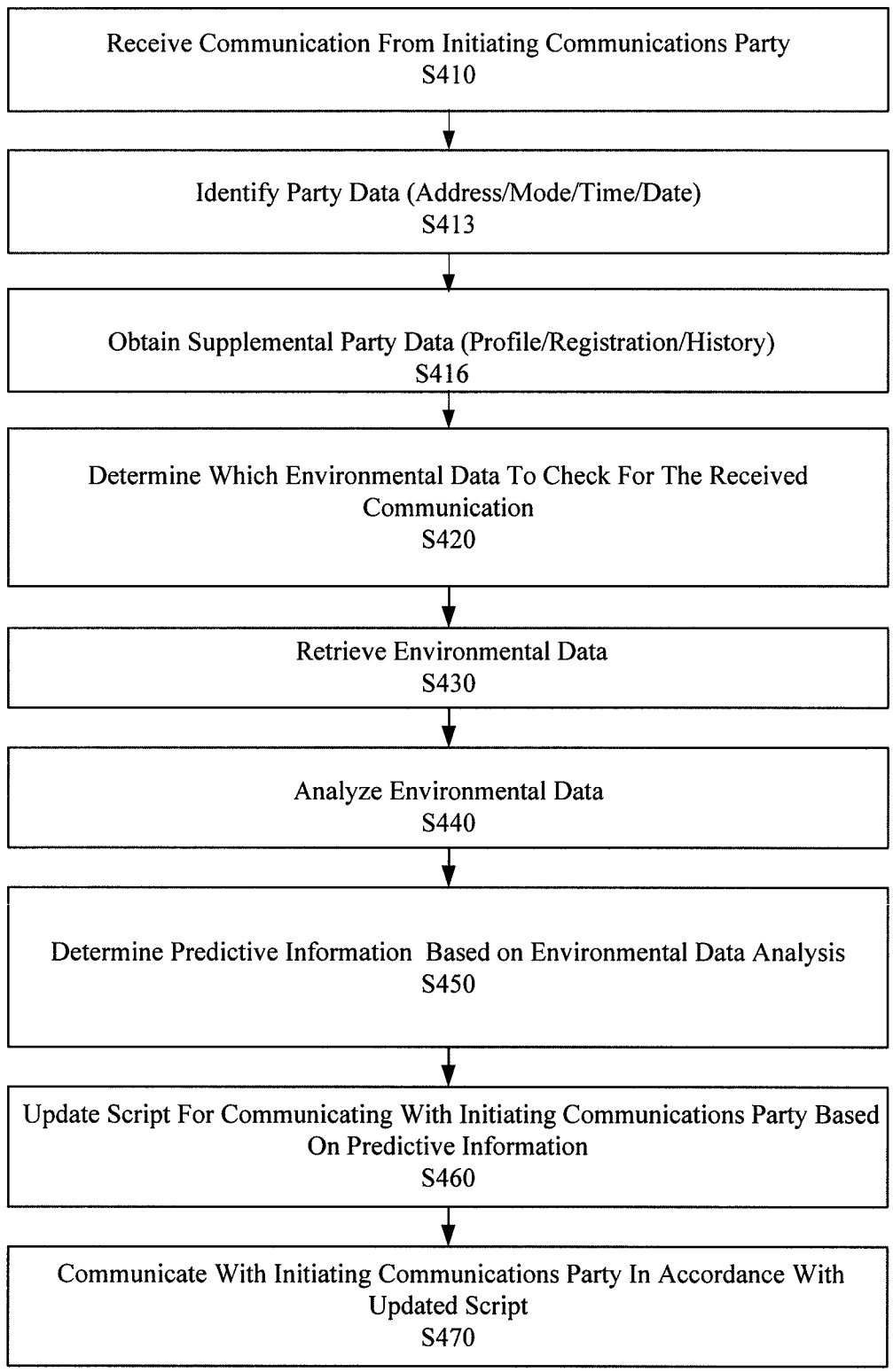
FIG. 4 shows an exemplary process for personalizing communications services using environmental data, according to an aspect of the present disclosure.

FIG. 4 shows an exemplary process for personalizing communications services using environmental data, according to an aspect of the present disclosure. In FIG. 4, a communication from an initiating party is received at S410. At S413, the initial party data received with or otherwise inherent to a communication is identified. This initial party data is the address of the sender/requester/initiator, as well as the mode of communication and time and date of the communication. At S416, the supplemental party data is obtained. Supplemental party data may be a profile or registration or history of the sender/requester/initiator, and may be automatically sent by a device used by the sender/requester/initiator or retrieved based on the initial party data by the interactive system. The initial party data is analyzed to identify parameters to use in identifying and analyzing environmental data. Parameters of party data that might be identified include party location, gender, age, subscriptions, equipment, or the other types of party data noted herein.

At S420, a determination is made as to which environmental data will be checked for the received communication. At S430, the environmental data is retrieved. The environmental data is analyzed at S440 based on the identified parameters of the party data. At S450, predictive information is determined based on the analysis of the environmental data. At S460, a script for communicating with the initiating party is updated based on the predictive information. At S470, the agent communicates with the initiating party in accordance with the updated script.

As an example, a communications party may initiate a call to a telephone number, or send a video conference request or a chat request over the Internet. Using the communications address of the initiating party, an interactive system that receives the call or request may check for recent calls or requests from the initiating party's area. When one or more popular reasons for recent calls or requests is found, the receiving system rearranges a script for interacting with the requesting communications party to offer the requesting communications party choices that include the one or more popular reasons for recent calls or requests. In this way, a utility company may rearrange a script for a caller or requester when the utility company's interactive system determines that the caller is in an area where other callers have recently reported service outages. The caller may then be greeted with an opening statement that includes an addition of option 1 in the following set of choices: "Thank you for calling your utility company. If you are calling to report a service outage in your area, press or say 1. If you are calling to request new service, press or say 2. If you are calling to request a chance to your service, press or say 3." This opening statement may be different from a default opening statement that does not initially provide an option of reporting a service outage.

Another example of how the process in FIG. 4 would be used involves an internet financial system. A subscriber to the system may request assistance, and a chat agent may analyze the party information of the subscriber to identify which environmental data to check. For example, a recent unsuccessful transaction attempt of the subscriber may be identified, and information that resolved inquiries of other parties with similar unsuccessful transaction attempts may be identified as environmental data that might be of use in resolving the subscribers concerns. Similarly, a subscriber who logs on to a financial system website may click a particular interactive assistance page, and the contents of the page may be arranged and presented in accordance with an analysis such as that performed in FIG. 4. The internet help page may be arranged to prominently display links to explanations of assistance for transactions of the type that the party recently unsuccessfully attempted.

Figure 5:
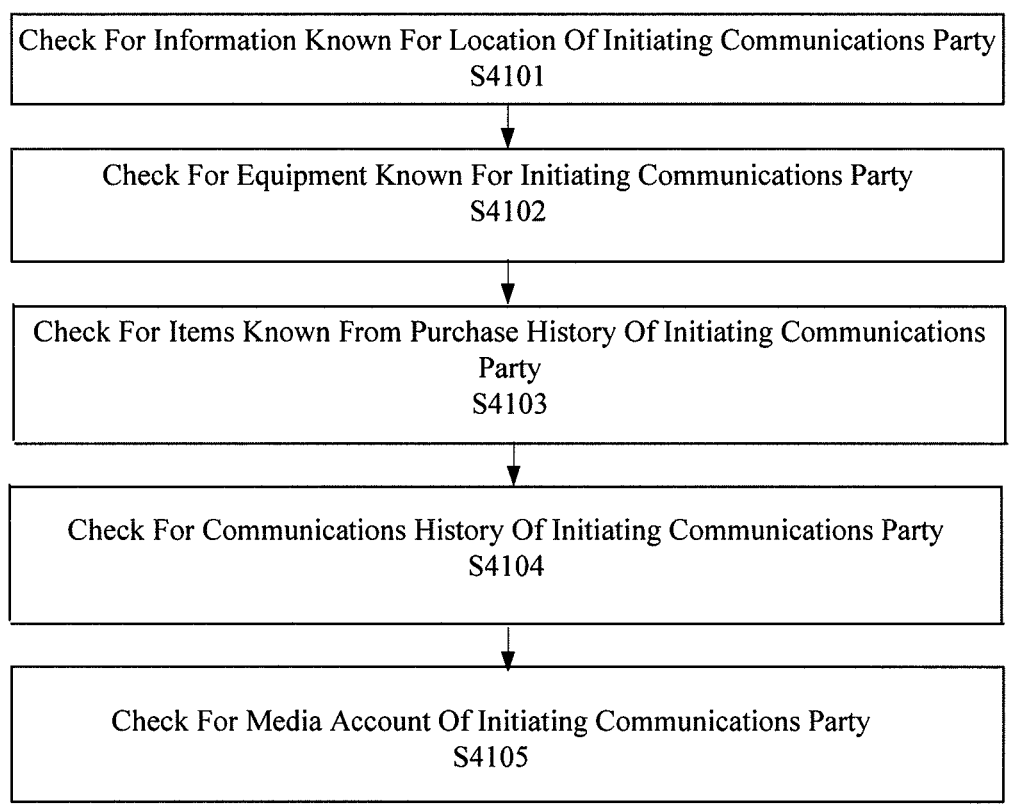
FIG. 5 shows another exemplary process for personalizing communications services using environmental data, according to an aspect of the present disclosure.

FIG. 5 shows another exemplary process for personalizing communications services using environmental data, according to an aspect of the present disclosure. In FIG. 5, In FIG. 5, a check is made for information known for a location of an initiating party at S4101. At S4102, a check is made for equipment known for an initiating party. At S4103, a check is made for items known from a purchase history of an initiating party. At S4104, a check is made for a communications history of an initiating party. At S4105, a check is made for a media account of an initiating party. In the embodiment of FIG. 5, the party data of an initiating party is used to identify environmental data. Various aspects of the environmental data are checked to see if the party data reveals a likely reason the party is initiating the communication.

Figure 6:
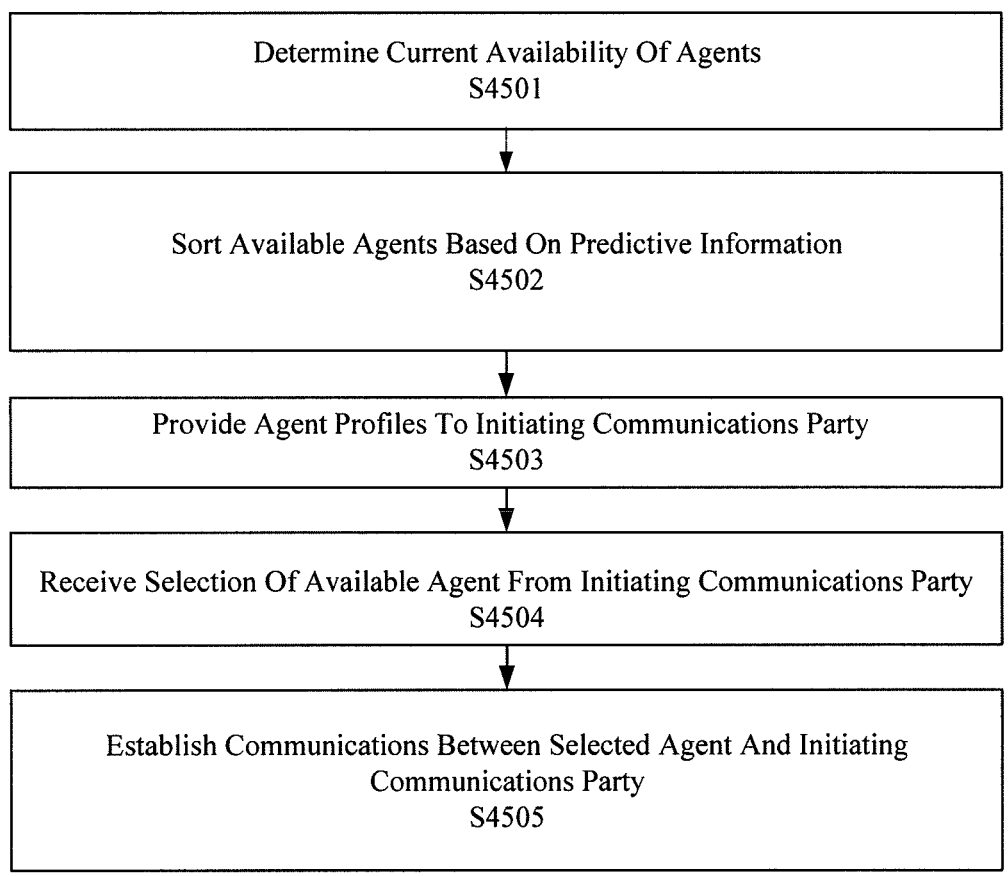
FIG. 6 shows another exemplary process for personalizing communications services using environmental data, according to an aspect of the present disclosure.

FIG. 6 shows another exemplary process for personalizing communications services using environmental data, according to an aspect of the present disclosure. At S4501, a current availability of agents is determined. The availability of agents may be determined after interaction with an interactive system, such as when a party decides to communicate with a live agent. At S4502, available agents are sorted based on predictive information that predicts and ranks or scores agents for suitability for a call or request. As noted previously, agents may be ranked based on a party's own previous communications with the agents. At S4503, agent profiles are provided to an initiating party such as a caller or Internet requester. At S4504, a selection of an available agent is received from an initiating party. At S4505, communications are established between a selected agent and an initiating party and the responsibility of an interactive system for a communication is ended.

Figure 7:
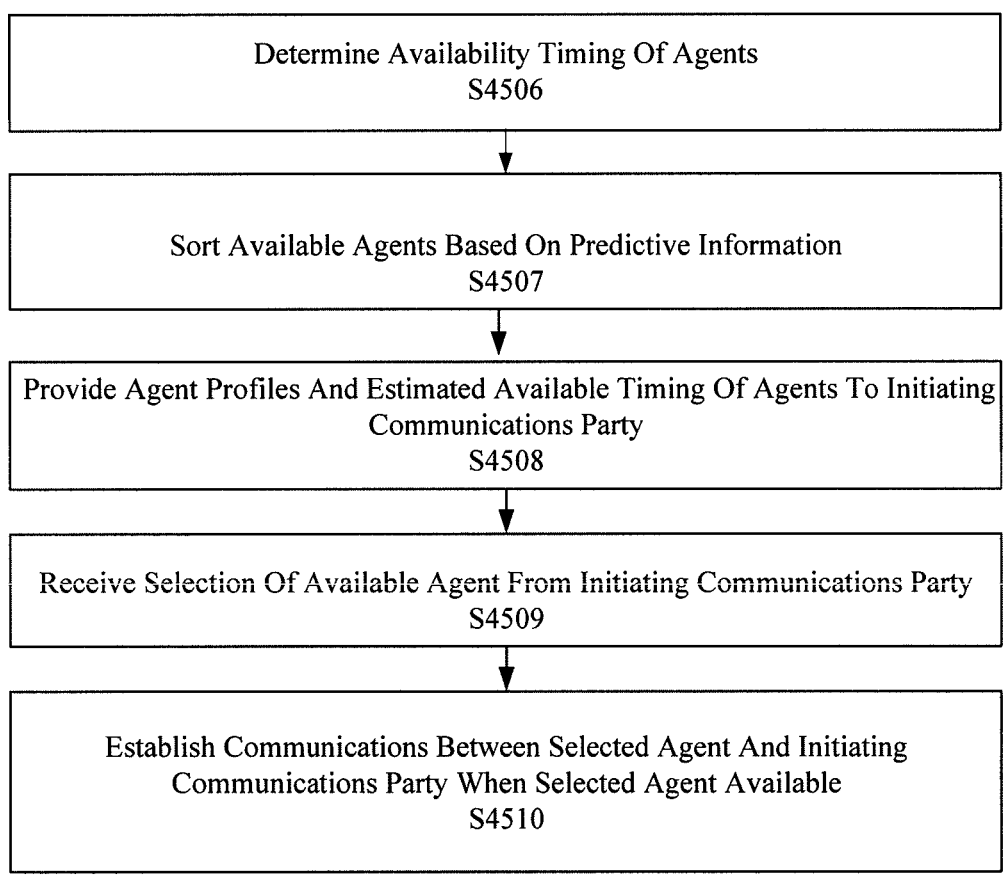
FIG. 7 shows another exemplary process for personalizing communications services using environmental data, according to an aspect of the present disclosure.

FIG. 7 shows another exemplary process for personalizing communications services using environmental data, according to an aspect of the present disclosure. At S4506, availability timing of agents is determined. At S4507, the available agents are sorted based on predictive information that predicts and ranks or scores agents for suitability for a call or request. At S4508, agent profiles and estimated available timing of agents are provided to an initiating party. At S4509, a selection of an available agent is received from the initiating party. At S4510, communications between the selected agent and an initiating party are established when the selected agent is available. Similar to the embodiment of FIG. 6, in the embodiment of FIG. 7 the selection of agents provided to the party may be provided as options of a script updated after referring to environmental data of previous communications involving parties with characteristics similar to the party data of the current party.

Figure 8A:
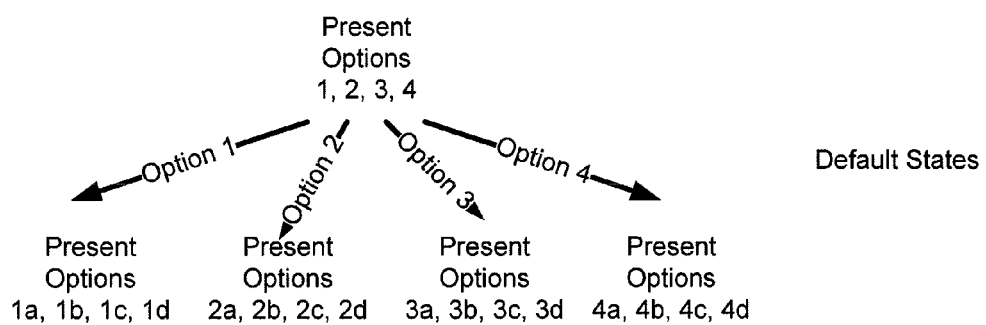
FIGS. 8a and 8b show an update to a script for personalizing communications services using environmental data, according to an aspect of the present disclosure.
Figure 8B:
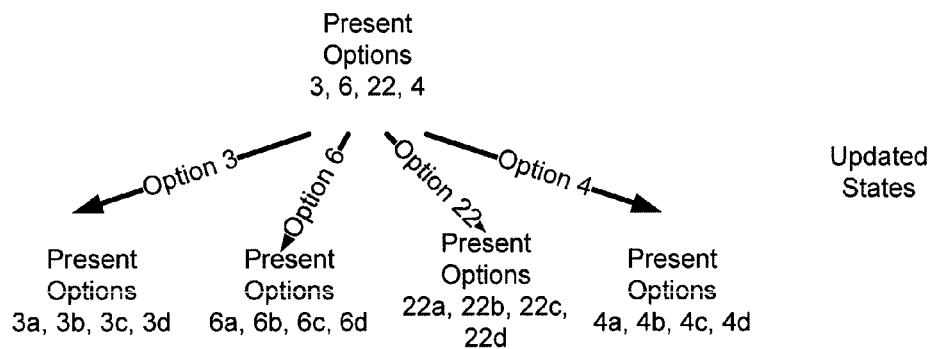

FIG. 8a and FIG. 8b show an update to a script for personalizing communications services using environmental data, according to an aspect of the present disclosure. As shown in FIG. 8a, options 1, 2, 3 and 4 are presented for selection, and selection of any such option results in presentation of four additional options for selection. In FIG. 8b, options 1, 2, 3 and 4 have been replaced with options 3, 6, 22 and 4 in an updated script, and selection of any such option results in presentation of four additional options for selection. Option 4 in both the default and update script may be a general option to review more options or speak with a representative. In the embodiment of FIG. 8, option 3 may be the most popular option for communications in the same area as the current communicating party, or may be the most popular option for communications involving the same or a similar service history as the service history of the current communicating party.

In FIGS. 8a and 8b, the update to a script is shown as an update in which default states are replaced based on the prediction of which options are most likely to be sought by the current communicating party. However, the update to a script may also be a rearrangement of default options, or a replacement or rearrangement of information provided to a current communications party. Further, the process at S440, S450 and S460 in FIG. 4 may be performed at multiple stages of a communication involving a party, so that the flow and states of the script are updated multiple times in a single communication with a party. Additionally, instead of updating a script, a script may be dynamically built using environmental data as described herein, where only options and information that meet a particular score threshold are presented at any stage.

FIG. 9 shows a table of predictive information for script options for a communication. As shown in FIG. 9, party data for a communication shows an area of the communication source, equipment known to be used or owned by the communication party, a gender of the communication party and an age range of the communication party. For the known party data, ultimate resolution probabilities are assigned to each of twenty six options that can be presented at a particular state (QFRR) of the script. This number of potential options is larger than a number of states conventionally used in scripts, and is set only for the purpose of demonstrating a possibility of the present disclosure. In FIG. 9, the four options (3, 6, 22, 4) from the first state of the updated script in FIG. 8b are shown to have the highest probability of ultimately resolving the new communication. Breakdowns of the assigned probabilities are also shown for the subsequent states for each option, i.e., 3a, 3b, 3c, 3d, 6a, 6b, 6c, 6d, 22a, 22b, 22c, 22d, 4a, 4b, 4c, 4d. A script may also be updated multiple times so that even the options for the subsequent states may be updated by rearrangement or replacement.

As described, party data for a party that initiates a communication can be used to identify environmental data, and the environmental data can be analyzed to determine predictive information for how the current communication with the party will most likely be satisfactorily resolved. A script for communicating with the party can be updated, and communications with the party can be provided in accordance with the updated script.

The interactive communications provided herein may be provided visually, and a party may be allowed to select options and information using a mouse or touch-screen. Stages of an interactive communication may be provided one at a time as in the manner of an interactive voice response session, or as a multi-stage tree of selectable options and information that shows the "next" stage of options and information that will be presented upon selection of each option of the "current" stage. The arrangement of the options and information may be personalized in the manner described herein, so that options and information presented visually to a party are those determined to be most likely the options and information sought by the party.

As described in the present disclosure, communications services can be personalized for callers and requesters using environmental data. The environmental data can be used in conjunction with identifying information of the party to maximize the possibility that the options presented to the caller or requester include an option sought by the caller or requester. Other uses of the analysis described herein can be to present commercials or particular musical entertainment during breaks or pauses in accordance with the environmental data from earlier communications. In this way, even a party's experience with pauses in a communication can be improved.

As set forth herein, according to an aspect of the present disclosure, a method for providing personalized communications services includes receiving, at an interactive system, a communication from an initiating party. A computer of the interactive system automatically determines predictive information for the communication based on environmental data provided for the communication independent of information provided by the initiating party during the communication. A script for communicating with the initiating party is automatically updated based on the predictive information. Communications with the initiating party are provided in accordance with the dynamically updated script.

According to another aspect of the present disclosure, the environmental data is data of a location of the initiating party.

According to yet another aspect of the present disclosure, the script is updated based on information known for the location.

According to still another aspect of the present disclosure, information known for the location is information obtained by previous communications from at least one other initiating party.

According to another aspect of the present disclosure, the environmental data is data of a known item of the initiating party.

According to yet another aspect of the present disclosure, the script is updated based on information known for the known item.

According to still another aspect of the present disclosure, the information known for the known item is information obtained by previous communications from at least one other initiating party.

According to another aspect of the present disclosure, the communications with the initiating party are presented to the initiating party visually.

According to yet another aspect of the present disclosure, an order of items in the script is arranged based on a predicted probability of each item addressing an unidentified problem for which the initiating party has initiated the communication.

According to still another aspect of the present disclosure, the script is updated based on information obtained from a media account of the initiating party.

According to another aspect of the present disclosure, the media account is a social media account.

According to yet another aspect of the present disclosure, the social media account of the initiating party is updated based on the communication.

According to still another aspect of the present disclosure, the initiating party is provided with a profile of an agent that communicates with the initiating party in the communication.

According to another aspect of the present disclosure, the interactive system is an interactive voice response system.

According to yet another aspect of the present disclosure, the initiating party is provided with profiles of each of a plurality of agents that can communicate with the initiating party.

According to still another aspect of the present disclosure, the initiating party is provided with times when each of the plurality of agents will be available and an option to select any of the agents to schedule a communication.

According to another aspect of the present disclosure, the profile of each agent includes a subject matter specialization of the agent.

According to yet another aspect of the present disclosure, the profiles includes a profile of at least one agent with whom the initiating party has previously communicated, and the profile of the at least one agent is provided based on the previous communication.

According to an aspect of the present disclosure, at least one non-transitory computer readable medium stores a set of executable instructions for providing personalized communications services. The executable instructions, when executed by a processor, cause at least one computer to receive, at an interactive system, a communication from an initiating party. A computer of the interactive system automatically determines predictive information for the communication based on environmental data provided for the communication independent of information provided by the initiating party during the communication. A script for communicating with the initiating party is updated based on the predictive information. Communications with the initiating party are provided in accordance with the dynamically updated script.

According to an aspect of the present disclosure, at least one computer platform of an interactive system executes executable instructions for providing personalized communications services. The at least one computer platform includes memory and a processor. The processor executes the executable instructions, and the instructions, when executed, cause the at least one computer platform to receive, at the interactive system, a communication from an initiating party. A computer of the interactive system automatically determines predictive information for the communication based on environmental data provided for the communication independent of information provided by the initiating party during the communication. A script for communicating with the initiating party is updated based on the predictive information. Communications with the initiating party are provided in accordance with the dynamically updated script.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for personalizing communication services, comprising:
   setting, from a plurality of selectable options, a series of selectable options as a default for a system that provides personalized communication services;
   receiving a communication from an initiating party;
   automatically determining, by a computer of the system and based on environmental data provided for the communication independent of information provided by the initiating party during the communication, predictive information that predicts potential objectives potentially sought by the initiating party in initiating the communication;
   assigning, based on the predictive information, probabilities that selectable options will address the potential objectives; and
   dynamically updating the default series of selectable options to an updated series of selectable options based on the assigned probabilities,
   wherein communications with the initiating party are in accordance with a script that includes the dynamically updated series of selectable options.

2. The method of claim 1, further comprising:
   obtaining, based on information provided during the communication, party data identifying the initiating party, and
   obtaining, based on the party data, supplemental party data comprising information provided by the initiating party previous to the communication,
   wherein the environmental data is determined based on the supplemental party data.

3. The method of claim 1,
   wherein the environmental data includes data of a location of the initiating party, and
   wherein the script is updated based on information known for the location.

4. The method of claim 3,
   wherein the information known for the location is information obtained by a previous communication from another initiating party.

5. The method of claim 1,
   wherein the checking environmental data comprises checking a purchase history for the initiating party, and
   wherein the environmental data includes data of an item of the initiating party known from the purchase history.

6. The method of claim 5,
   wherein the dynamically updating is based on information known for the item known from the purchase history.

7. The method of claim 1, further comprising:
   assigning, based on the predictive information, probabilities that currently available agents will successfully address the potential objectives.

8. The method of claim 1,
   wherein the communication with the initiating party is presented to the initiating party visually.

9. The method of claim 1,
   wherein the dynamically updating comprises removing at least one selectable option from the script and adding at least one selectable option to the script.

10. The method of claim 1,
    wherein the dynamically updating comprises changing a presentation order of at least one selectable option.

11. The method of claim 1,
    wherein the script is updated also based on information obtained from a social media account of the initiating party, and wherein the social media account is updated based on the communication.

12. The method of claim 1, further comprising:
after the updated series of selectable options are presented to the initiating party and the initiating party makes a selection among the updated series of selectable options, again assigning, based on the predictive information, probabilities that selectable options will address the potential objectives; and
and dynamically updating the script to include selectable options based on the selection by the initiating party and the again assigned probabilities,
wherein communications with the initiating party are in accordance with a script that includes the dynamically updated series of selectable options.

13. The method of claim 1, further comprising:
providing to the initiating party a profile of an agent that communicates with the initiating party in the communication.

14. The method of claim 1,
wherein the environmental data is obtained is obtained without any input from the initiating party in the communication, and comprises information obtained by a previous communication from another initiating party.

15. The method of claim 1, further comprising:
automatically receiving, from a device used by the initiating party to initiate the communication, party data identifying the initiating party, and
obtaining supplemental party data comprising information provided by the initiating party previous to the communication.

16. The method of claim 1, further comprising:
providing the initiating party profiles of each of a plurality of agents that can communicate with the initiating party, and
providing the initiating party times when each of the plurality of agents will be available and an option to select any of the plurality of agents to schedule a communication.

17. The method of claim 1, further comprising:
providing the initiating party profiles of each of a plurality of agents that can communicate with the initiating party,
wherein a profile of each agent includes a subject matter specialization of the agent.

18. The method of claim 1, further comprising:
providing the initiating party profiles of each of a plurality of agents that can communicate with the initiating party,
wherein the profiles includes a profile of an agent with whom the initiating party has previously communicated.

19. A non-transitory computer readable medium that stores a set of executable instructions for personalizing communication services, the executable instructions, when executed by a processor, causing a computer to perform operations comprising:
setting, from a plurality of selectable options, a series of selectable options as a default for a system that provides personalized communication services;
receiving a communication from an initiating party;
automatically determining, by a computer of the system and based on environmental data provided for the communication independent of information provided by the initiating party during the communication, predictive information that predicts potential objectives potentially sought by the initiating party in initiating the communication;
assigning, based on the predictive information, probabilities that selectable options will address the potential objectives; and
dynamically updating the default series of selectable options to an updated series of selectable options based on the assigned probabilities,
wherein communications with the initiating party are in accordance with a script that includes the dynamically updated series of selectable options.

20. A computer platform of a system that executes executable instructions for personalizing communication services, the computer platform comprising:
memory; and
a processor,
wherein the processor executes the executable instructions, and the instructions, when executed, cause the computer platform to perform operations comprising:
setting, from a plurality of selectable options, a series of selectable options as a default for a system that provides personalized communication services;
receiving a communication from an initiating party;
automatically determining, by a computer of the system and based on environmental data provided for the communication independent of information provided by the initiating party during the communication, predictive information that predicts potential objectives potentially sought by the initiating party in initiating the communication;
assigning, based on the predictive information, probabilities that selectable options will address the potential objectives; and
dynamically updating the default series of selectable options to an updated series of selectable options based on the assigned probabilities,
wherein communications with the initiating party are in accordance with a script that includes the dynamically updated series of selectable options.

* * * * *

UNITED STATES PATENT AND TRADEMARK OFFICE
CERTIFICATE OF CORRECTION

PATENT NO. : 9,560,201 B2
APPLICATION NO. : 14/989102
DATED : January 31, 2017
INVENTOR(S) : T. Stine et al.

It is certified that error appears in the above-identified patent and that said Letters Patent is hereby corrected as shown below:

In the Claims

Column 15, Lines 9, 10 (Claim 12, Lines 7, 8) please change "; and and" to -- ; and --
Column 15, Line 22 (Claim 14, Line 2) please change "data is obtained is obtained" to -- data is obtained --
Column 15, Line 52 (Claim 18, Line 5) please change "profiles includes" to -- profiles include --

Signed and Sealed this
Twenty-eighth Day of November, 2017

Joseph Matal
*Performing the Functions and Duties of the
Under Secretary of Commerce for Intellectual Property and
Director of the United States Patent and Trademark Office*